United States Patent
Linguist et al.

(10) Patent No.: US 9,340,438 B2
(45) Date of Patent: May 17, 2016

(54) SYSTEMS AND METHODS FOR DELIVERING DISSOLVED GASES INTO FORCE-MAIN AND GRAVITY SEWERS

(75) Inventors: Larry K. Linguist, Denham Springs, LA (US); Clay R. Thompson, Fayetteville, AR (US); Christopher B. Milligan, Fayetteville, AR (US); Gregory Scott Osborn, Fayetteville, AR (US)

(73) Assignees: Board of Trustees of the University of Arkansas, Little Rock, AR (US); BlueInGreen, LLC, Fayetteville, AR (US)

( * ) Notice: Subject to any disclaimer, the term of this patent is extended or adjusted under 35 U.S.C. 154(b) by 628 days.

(21) Appl. No.: 13/601,124

(22) Filed: Aug. 31, 2012

(65) Prior Publication Data

US 2013/0056423 A1     Mar. 7, 2013

Related U.S. Application Data

(63) Continuation-in-part of application No. 11/921,057, filed on Nov. 7, 2008, now Pat. No. 8,276,888.

(60) Provisional application No. 61/529,521, filed on Aug. 31, 2011.

(51) Int. Cl.
   *B01F 3/04*     (2006.01)
   *C02F 1/78*     (2006.01)
   *C02F 1/74*     (2006.01)

(52) U.S. Cl.
   CPC ... *C02F 1/78* (2013.01); *C02F 1/74* (2013.01); *C02F 2209/006* (2013.01)

(58) Field of Classification Search
   CPC .... B01F 3/04014; B01F 3/04021; C02F 1/74; C02F 1/78; C02F 2209/006; E03F 5/14
   USPC ........ 261/28, 37, 77, 78.2, 115, 119.1, 122.1, 261/124; 210/739, 741, 749, 198.1
   See application file for complete search history.

(56) References Cited

U.S. PATENT DOCUMENTS

| | | | |
|---|---|---|---|
| 3,643,403 A | 2/1972 | Speece | |
| 3,772,187 A | 11/1973 | Othmer | |

(Continued)

FOREIGN PATENT DOCUMENTS

| | | |
|---|---|---|
| DE | 35 01 175 A1 | 7/1986 |
| JP | 08132094 | 5/1996 |

(Continued)

OTHER PUBLICATIONS

Extended European Search Report; European Patent Office; European Patent Application No. 06771268.7 (Oct. 23, 2012).

(Continued)

*Primary Examiner* — Charles Bushey
(74) *Attorney, Agent, or Firm* — Richard Blakely Glasgow

(57) ABSTRACT

Disclosed are systems and methods for dissolving gases into a fluid that is passing through a force-main and gravity sewer system. The system includes a dissolution tank having a pressure vessel for containing a liquid and for providing a regulated gas head space above the liquid, an inlet that permits passage of wastewater into the gas head space, and an outlet that permits passage of treated wastewater out of the pressure vessel. The system also includes a gas source in communication with the pressure vessel; a pump for supplying wastewater from a force-main or sewer system sump into the pressure vessel under conditions effective to dissolve oxygen gas in the wastewater; and a discharge device in communication with the outlet of the dissolution tank assembly for discharging treated wastewater.

21 Claims, 14 Drawing Sheets

(56) References Cited

U.S. PATENT DOCUMENTS

| | | | |
|---|---|---|---|
| 3,856,671 A | 12/1974 | Lee et al. | |
| 3,932,282 A | 1/1976 | Ettelt | |
| 3,960,066 A | 6/1976 | LaRocco et al. | |
| 4,086,152 A | 4/1978 | Rich et al. | |
| 4,132,637 A | 1/1979 | Key et al. | |
| 4,163,712 A | 8/1979 | Smith | |
| 4,256,574 A | 3/1981 | Bhargava | |
| 4,317,731 A * | 3/1982 | Roberts et al. | 210/741 |
| 4,461,426 A | 7/1984 | Christopher | |
| 4,501,664 A | 2/1985 | Heil et al. | |
| 4,652,382 A * | 3/1987 | Edwards et al. | 210/752 |
| 4,735,750 A | 4/1988 | Damann | |
| 4,863,643 A | 9/1989 | Cochran | |
| 4,981,582 A | 1/1991 | Yoon et al. | |
| 5,275,742 A | 1/1994 | Satchell, Jr. et al. | |
| 5,376,265 A | 12/1994 | Szabo | |
| 5,382,358 A | 1/1995 | Yeh | |
| 5,451,349 A | 9/1995 | Kingsley | |
| 5,487,835 A | 1/1996 | Shane | |
| 5,514,264 A | 5/1996 | Shane | |
| 5,569,180 A | 10/1996 | Spears | |
| 5,637,231 A | 6/1997 | Hill et al. | |
| 5,647,977 A | 7/1997 | Arnaud | |
| 5,674,312 A | 10/1997 | Mazzei | |
| 5,735,934 A | 4/1998 | Spears | |
| 5,766,484 A | 6/1998 | Petit et al. | |
| 5,865,995 A | 2/1999 | Nelson | |
| 5,885,467 A | 3/1999 | Zelenak | |
| 5,904,851 A | 5/1999 | Taylor et al. | |
| 5,911,870 A | 6/1999 | Hough | |
| 5,951,921 A | 9/1999 | Koganezawa et al. | |
| 5,968,421 A | 10/1999 | Schattney et al. | |
| 5,979,363 A | 11/1999 | Shaar | |
| 6,076,808 A | 6/2000 | Porter | |
| 6,090,294 A | 7/2000 | Teran et al. | |
| 6,153,111 A | 11/2000 | Conrad et al. | |
| 6,193,893 B1 | 2/2001 | Mazzei et al. | |
| 6,279,882 B1 | 8/2001 | Littman et al. | |
| 6,280,633 B1 | 8/2001 | Conrad et al. | |
| 6,284,138 B1 * | 9/2001 | Mast | 210/606 |
| 6,315,893 B1 | 11/2001 | Sawada | |
| 6,344,489 B1 | 2/2002 | Spears | |
| 6,372,131 B1 * | 4/2002 | Mirowsky et al. | 210/205 |
| 6,474,627 B2 | 11/2002 | Speece | |
| 6,485,003 B2 | 11/2002 | Speece | |
| 6,488,271 B1 | 12/2002 | Nelson | |
| 6,503,403 B2 | 1/2003 | Green et al. | |
| 6,530,895 B1 | 3/2003 | Keirn | |
| 6,555,059 B1 | 4/2003 | Myrick et al. | |
| 6,565,807 B1 | 5/2003 | Patterson | |
| 6,568,661 B1 | 5/2003 | Shane | |
| 6,637,731 B2 | 10/2003 | Shane | |
| 6,730,214 B2 | 5/2004 | Mazzei | |
| 6,767,008 B2 | 7/2004 | Shane | |
| 6,817,541 B2 | 11/2004 | Sands et al. | |
| 6,840,983 B2 | 1/2005 | McNulty | |
| 6,848,258 B1 | 2/2005 | Speece | |
| 6,855,291 B2 | 2/2005 | Patterson et al. | |
| 6,877,726 B1 | 4/2005 | Rindt et al. | |
| 6,936,179 B2 * | 8/2005 | DeWald | 210/760 |
| 6,962,654 B2 | 11/2005 | Arnaud | |
| 6,964,738 B1 | 11/2005 | Shen | |
| 6,983,929 B2 | 1/2006 | Shane | |
| 7,008,535 B1 * | 3/2006 | Spears et al. | 210/220 |
| 7,255,332 B2 * | 8/2007 | Osborn et al. | 261/28 |
| 7,294,278 B2 * | 11/2007 | Spears et al. | 210/758 |
| 7,566,397 B2 * | 7/2009 | Speece | 210/205 |
| 7,622,036 B2 | 11/2009 | Morse | |
| 7,695,622 B2 | 4/2010 | Fabiyi | |
| 7,833,410 B2 | 11/2010 | Morse | |
| 8,276,888 B2 * | 10/2012 | Osborn et al. | 261/28 |
| 2002/0134736 A1 | 9/2002 | Burris et al. | |
| 2002/0158012 A1 | 10/2002 | Christodoulatos | |
| 2003/0071372 A1 | 4/2003 | Scherzinger et al. | |
| 2003/0183584 A1 * | 10/2003 | Galatro et al. | 210/760 |
| 2003/0209502 A1 | 11/2003 | Lacasse et al. | |
| 2005/0040548 A1 | 2/2005 | Lee et al. | |
| 2008/0017590 A1 | 1/2008 | Suchak et al. | |
| 2009/0101572 A1 | 4/2009 | Sullivan | |

FOREIGN PATENT DOCUMENTS

| | | |
|---|---|---|
| JP | 2001-347146 | 12/2001 |
| JP | 2004 188263 | 8/2005 |
| JP | 2004188263 | 8/2005 |
| WO | 0211870 A2 | 2/2002 |

OTHER PUBLICATIONS

Office Action, U.S. Appl. No. 13/415,402 (issued Aug. 24 2015).
Communication: European Patent Application No. 06 771 268.7, European Patent Office (issued Jul. 15, 2015).
Examiner's Report: Australian Patent Application No. 2006249808, Australian Patent Office (issued May 27, 2010).
Japanese Office Action: Japanese Patent Application No. 2008-513750, Japanese Patent Office (issued Feb. 1, 2011) (Japanese).
Japanese Office Action: Japanese Patent Application No. 2008-513750, Japanese Patent Office (issued Feb. 1, 2011) (English).
Examination Report: New Zealand Patent Application No. 563542, New Zealand Patent Office (issued Dec. 15, 2010).
Mexican Office Action: Mexican Patent Application No. Mx/a/2007/014750, Mexican Patent Office (issued Mar. 17, 2011) (Spanish).
Mobley Engineering, Side Stream Super-Saturation, http://www.mobleyengineering.com/technologies/hydropowerenhancements.html (last visited May 23, 2012).
Japanese Decision of Final Rejection: Japanese Patent Application No. 2008-513750, Japanese Patent Office (issued Feb. 7, 2012) (English).
Japanese Decision of Final Rejection: Japanese Patent Application No. 2008-513750, Japanese Patent Office (issued Feb. 7, 2012) (Japanese).
Examiner's Report: Canadian Patent Application No. 2,609,030, Canadian Intellectual Property Office (issued Jan. 15, 2013).
Communication: European Patent Application No. 06 771 268.7, European Patent Office (issued Oct. 8, 2013).
Communication: European Patent Application No. 06 771 268.7, European Patent Office (issued Jan. 22, 2015).
Office Action, U.S. Appl. No. 13/415,539 (issued Apr. 1, 2015).
Office Action, U.S. Appl. No. 13/600,859 (issued Jul. 15, 2013).
Office Action, U.S. Appl. No. 13/600,859 (issued May 19, 2014).
Office Action, U.S. Appl. No. 13/600,859 (issued Nov. 7, 2013).
Office Action, U.S. Appl. No. 13/415,402 (issued Mar. 24, 2015).
Office Action, U.S. Appl. No. 13/600,950 (issued Feb. 10, 2015).

* cited by examiner

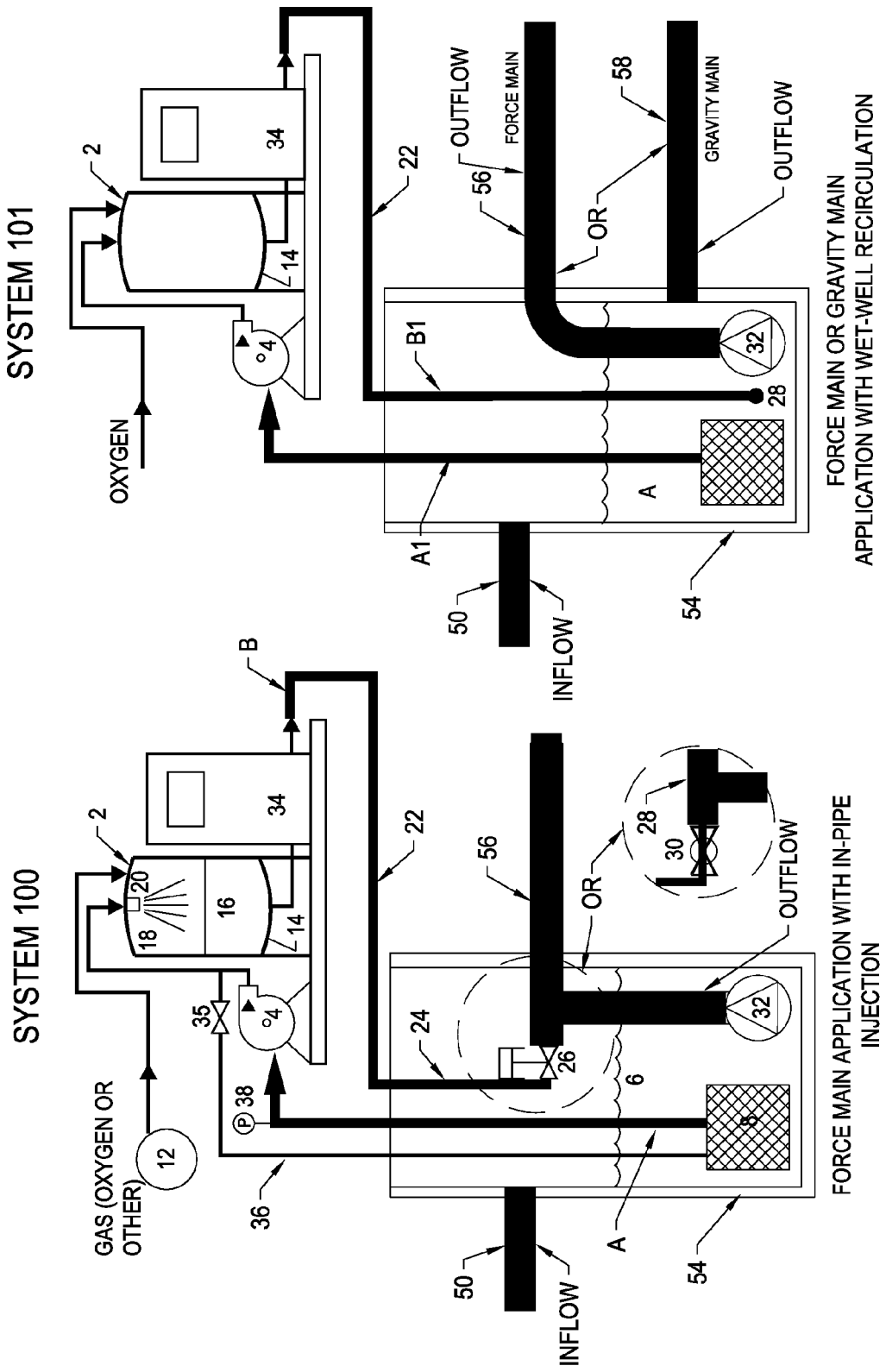

FIG. 2A
LEGEND

ACCESSORIES AND APPURTENANCES

| SYMBOL | DESCRIPTION | SYMBOL | DESCRIPTION |
|---|---|---|---|
| | UNION | (P) | GAUGE |
| | PLUG | | P = PRESSURE |
| | BLIND FLANGE | | V = VACUUM |
| | HOSE CONNECTION | | T = TEMPERATURE |
| | SPRAY NOZZLE | | dP = PRESSURE DIFFERENTIAL |
| | DRAIN | | |
| | FLEXIBLE CONNECTION, GENERAL | | |
| | FLEXIBLE HOSE | | |
| | QUICK CONNECTOR | | |
| | THREADED TAP | | |
| | FILTER | | |
| | 'Y' TYPE STRAINER | | |
| | STRAINER | | |
| | EXPANSION JOINT | | |
| FCO | FLOOR CLEANOUT | | |

VALVE OPERATORS

| SYMBOL | DESCRIPTION |
|---|---|
| | HAND OPERATOR |
| | HAND OPERATOR (LONG) |
| | CHAIN OPERATOR |
| (F) | FLOAT OPERATOR |
| | AIR DIAPHRAGM OPERATOR |
| | POSITIONER |
| [S] | SOLENOID OPERATOR |
| | CYLINDER OPERATOR |
| | PRESSURE BALANCED DIAPHRAGM OPERATOR |
| (M) | MOTOR OPERATOR |
| [D] | DIGITAL OPERATOR |
| (EH) | ELECTRO-HYDRAULIC OPERATOR |
| | FAIL ARROWS INDICATE OPEN PORTS |
| | LIMIT SWITCH |

FIG. 2B
LEGEND

VALVES

| SYMBOL | DESCRIPTION | SYMBOL | DESCRIPTION |
|---|---|---|---|
| ⟆ | CHECK VALVE | ⟕ | PRESSURE CONTROL |
| ⋈ | GATE VALVE | ⟕ | PRESSURE RELIEF VALVE |
| ⊥ | BUTTERFLY VALVE | ⟕ | VACUUM RELIEF VALVE |
| ⟡ | BALL CHECK | ▷ | MUD VALVE |
| ⟠ | BALL VALVE | | |
| ⟆ | PLUG VALVE | | |
| ⊙ | NEEDLE VALVE | | |
| ⊙ | ROTARY VALVE | | |
| ⊥ | KNIFE GATE VALVE | | |
| ⟠ | PINCH VALVE | | |
| ⊠ | THREE WAY VALVE | | |
| ⊠ | FOUR WAY VALVE | | |
| ⦿ | GLOBE VALVE | | |
| ⟟ | CHARACTERIZED OR VEE-BALL VALVE | | |
| ⟆ | STOP CHECK VALVE | | |
| ⊲ | DIAPHRAGM VALVE (SELF CONTAINED) | | |

SIGNAL CONDITIONERS

| SYMBOL | DESCRIPTION | SYMBOL | DESCRIPTION |
|---|---|---|---|
| $A_D$ | ANALOG TO DIGITAL | $\Sigma$ | SUM |
| $D_A$ | DIGITAL TO ANALOG | $\triangleleft$ | DIFFERENCE |
| $I_P$ | CURRENT TO PRESSURE | $\sqrt{}$ | SQUARE ROOT |
| $P_I$ | PRESSURE TO CURRENT | $f(x)$ | CHARACTERIZATION |
| $F_I$ | FREQUENCY TO CURRENT | $\int$ | INTEGRATION |
| $I_I$ | CURRENT BOOST/ REPEATER | | |

FIG. 2C
LEGEND

PROCESS EQUIPMENT

| SYMBOL | DESCRIPTION |
|---|---|
| Ⓜ | ELECTRIC MOTOR |
| ⊡V | VARIABLE SPEED DRIVE |
| Ⓖ | ELECTRIC GENERATOR |
| HYDRAULIC MOTOR symbol | HYDRAULIC MOTOR |
| AIR MOTOR symbol | AIR MOTOR |
| ⇩ | SHAFT COUPLING |
| DYNAMIC PUMP symbol | DYNAMIC PUMP |
| DYNAMIC COMPRESSOR symbol | DYNAMIC COMPRESSOR |
| ▲□ | POSITIVE DISPLACEMENT PUMP |
| △□ | POSITIVE DISPLACEMENT COMPRESSOR |
| EDUCTOR symbol | EDUCTOR/EJECTOR |

| SYMBOL | DESCRIPTION |
|---|---|
| heater symbol | HEATER, GENERAL |
| heater w/fan induced | HEATER W/FAN (INDUCED DRAFT) |
| heater w/fan forced | HEATER W/FAN (FORCED DRAFT) |
| heat exchanger symbol | HEAT EXCHANGER, GENERAL |
| hydraulic cylinder symbol | HYDRAULIC CYLINDER |
| air cylinder symbol | AIR CYLINDER |

EQUIPMENT LINE TYPES

| LINE | DESCRIPTION |
|---|---|
| ———— | STANDARD EQUIPMENT |
| - - - - | OPTIONAL EQUIPMENT |

FIG. 2D
LEGEND
INSTRUMENT PRIMARY ELEMENTS

| SYMBOL | DESCRIPTION | SYMBOL | DESCRIPTION |
|---|---|---|---|
| ⊣□ | THREADED TAP | ⊓ | TARGET ELEMENT |
| ○ | THERMOWELL | (MASS) | MASS FLOWMETER |
| ◯ | SIGHT FLOW INDICATOR | | |
| ⬭ | ROTAMETER | ∿ | SONIC FLOWMETER |
| ⊣⊢ | FLOW ORIFICE | M | MAGNETIC FLOWMETER |
| ⇦ | FLOW ORIFICE IN QUICK CHANGE FITTING | pH electrode | pH ELECTRODE ASSEMBLY |
| ⊓ | SINGLE PORT PITOT | P | PRESSURE SENSOR |
| )( | VENTURI TUBE | | |
| ⧛ | AVERAGING PITOT STATION | ⌒ | WATER HAMMER ARRESTER |
| ⟩\⟨ | FLUME | ))) | ULTRASONIC LEVEL TRANSMITTER |
| ⋁ | WEIR | | |
| ∞ | TURBINE ELEMENT | | |
| 8 | POSITIVE DISPLACEMENT FLOWMETER | | |
| △ | VORTEX SENSOR | | |

FIG. 2E
LEGEND

AUXILIARY INSTRUMENTS OR FUNCTIONS

| SYMBOL | DESCRIPTION | SYMBOL | DESCRIPTION |
|---|---|---|---|
| (test point symbol) | TEST POINT, TERMINAL BLOCK WITH SLIDING LINK AND MINI-BANANA SOCKETS | +/− PS | LOOP POWER SUPPLY |
| ◇P | PURGE OR FLUSHING DEVICE | pH | POWER OF HYDROGEN |
| ◇I | INTERLOCK LOGIC WITH REFERENCE | TURB. | TURBIDITY |
| (diaphragm symbol) | DIAPHRAGM SEAL | | |
| ◇R | RESET FOR LATCH TYPE OPERATOR | | |
| ◇ | PANEL MOUNTED PATCHBOARD POINT | | |
| (pilot light symbol) | PILOT LIGHT FOR PROCESS SIGNALS | | |
| (two circles) | INSTRUMENTS SHARING COMMON HOUSING | | |

FIG. 2F
LEGEND

IDENTIFICATION, GENERAL

| SYMBOL | DESCRIPTION |
|---|---|
| XX-XX-XX | EQUIPMENT TAG |
| 08-I-501 | SHEET INTERFACE<br>— SHEET NUMBER<br>— DRAWING TYPE<br>— SEQUENCE NUMBER |
| 08-I-501<br>FROM/TO<br>XXXX | SHEET INTERFACE WITH PROCESS FLAG<br>— PROCESS |

PIPING LINE TYPES

| LINE | DESCRIPTION |
|---|---|
| ——— | PROCESS LINE - PRIMARY |
| ——— | PROCESS LINE - SECONDARY |
| ——— | PACKAGE BOUNDARY |
| ——— | AREA/BUILDING BOUNDARY |
| - - - - | SHOWN ELSEWHERE |

PIPING, MISCELLANEOUS

| SYMBOL | DESCRIPTION |
|---|---|
| → | SLOPE ARROW<br>ARROW DIRECTION DOWN |
| ST | LINE HEAT TRACED AND INSULATED<br>ST = STEAM TRACED<br>ET = ELECTRIC TRACED |
| ▨ | OUTSIDE GRADE LEVEL |

INSTRUMENT POWER SUPPLY

IA 120 PSIG — POWER SUPPLY, TYPE AND LEVEL SHOWN, ABBREVIATIONS AS FOLLOWS:
- AS - AIR SUPPLY
- IA - INSTRUMENT AIR
- PA - PLANT AIR
- ES - ELECTRIC SUPPLY
- GS - GAS SUPPLY
- HS - HYDRAULIC SUPPLY
- NS - NITROGEN SUPPLY
- ST - STEAM SUPPLY
- WS - WATER SUPPLY

FIG. 2G
LEGEND

INSTRUMENT LINE TYPES

| LINE | DESCRIPTION |
|---|---|
| ---------- | PROCESS CONNECTION |
| —————— | UNDEFINED SIGNAL |
| ———————— | PNEUMATIC SIGNAL |
| ———————— | ELECTRIC SIGNAL |
| ———————— | HYDRAULIC SIGNAL |
| —#—#—#— | CAPILLARY OR FILLED TUBE |
| ~~~~~~~~ | ELECTROMAGNETIC OR SONIC SIGNAL (GUIDED) |
| ~ ~ ~ ~ | ELECTROMAGNETIC OR SONIC SIGNAL (UNGUIDED) |
| — — — — | INTERNAL SYSTEM LINK (SOFTWARE OR DATA LINK) |
| — — — — | MECHANICAL LINK |
| — — — — — | PNEUMATIC BINARY (ON-OFF) SIGNAL |
| – – – – – | ELECTRIC BINARY (ON-OFF) SIGNAL |

FIG. 2H
LEGEND

MEANING OF FUNCTIONAL INSTRUMENT IDENTIFICATION LETTERS

| | FIRST LETTER | | SUCCEEDING LETTERS | | |
|---|---|---|---|---|---|
| | MEASURED OR INITIATING VARIABLE | MODIFIER | READOUT OR PASSIVE FUNCTION | OUTPUT FUNCTION | MODIFIER |
| A | ANALYSIS | | ALARM | | |
| B | BURNER FLAME | | USER CHOICE | USER CHOICE | USER CHOICE |
| C | CONDUCTIVITY (ELECTRICAL) | | | CONTROL | |
| D | DENSITY (MASS) OR SPECIFIC GRAVITY | DIFFERENTIAL | | | |
| E | VOLTAGE (EMF) | | PRIMARY ELEMENT | | |
| F | FLOW RATE | RATIO(FRACTION) | | | |
| G | GAUGING(DIMENSIONAL) | | GLASS | | |
| H | HAND(MANUALLY INITIATED) | | | | HIGH |
| I | CURRENT(ELECTRICAL) | | INDICATE | | |
| J | POWER | SCAN | | | |
| K | TIME OR TIME-SCHEDULE | | | CONTROL STATION | |
| L | LEVEL | | LIGHT(PILOT) | | LOW |
| M | MOISTURE OR HUMIDITY | MOMENTARY | | | MIDDLE OR INTERMEDIATE |
| N | USER CHOICE | | USER CHOICE | USER CHOICE | USER CHOICE |
| O | USER CHOICE | | ORIFICE(RESTRICTION) | | |

(CONT ON FIG. 2I)

FIG. 2I
LEGEND

MEANING OF FUNCTIONAL INSTRUMENT IDENTIFICATION LETTERS (CONT FROM FIG. 2H)

| | FIRST LETTER | | SUCCEEDING LETTERS |
|---|---|---|---|
| P | PRESSURE OR VACUUM | POINT(TEST POINT) | |
| Q | QUANTITY OR EVENT | INTEGRATE OR TOTALIZE | |
| R | RADIATION | RECORD OR PRINT | |
| S | SPEED OR FREQUENCY | SAFETY | SWITCH |
| T | TEMPERATURE | | TRANSMIT |
| U | MULTIVARIABLE | MULTIFUNCTION | MULTIFUNC. | MULTIFUNCTION |
| V | VIBRATION OR MECHANICAL ANALYSIS | | VALVE, DAMPER, OR LOUVER |
| W | WEIGHT OR FORCE | WELL | |
| X | UNCLASSIFIED | UNCLASSIFIED | UNCLASSIFIED | UNCLASSIFIED |
| Y | EVENT, STATE OR PRESENCE | | RELAY OR COMPUTE |
| Z | POSITION | | DRIVE, ACTUATE OR UNCLASSIFIED FINAL CONTROL ELEMENT |

JI  SURGE ARRESTOR, SEE SPECIFICATIONS

FIG. 2J
LEGEND

INSTRUMENTS OR FUNCTIONS

KEY
[SYMBOL]
BLOCK TAG

| | PRIMARY LOCATION; OPERATOR ACCESSIBLE | AUXILIARY LOCATION; OPERATOR ACCESSIBLE | LOCATION NOT NORMALLY OPERATOR ACCESSIBLE | FIELD MOUNTED |
|---|---|---|---|---|
| DISCRETE INSTRUMENTS | ⊖ | ⊖ | ⊖ (dashed) | ○ |
| SHARED DISPLAY SHARED CONTROL | ⊟⊖ | ⊟⊖ | ⊟⊖ (dashed) | ⊟○ |
| COMPUTER FUNCTION | ⬡ | ⬡ | ⬡ (dashed) | ⬡ |
| PROGRAMMABLE LOGIC CONTROLLER | ⊟⬡ | ⊟⬡ | ⊟⬡ (dashed) | ⊟⬡ |

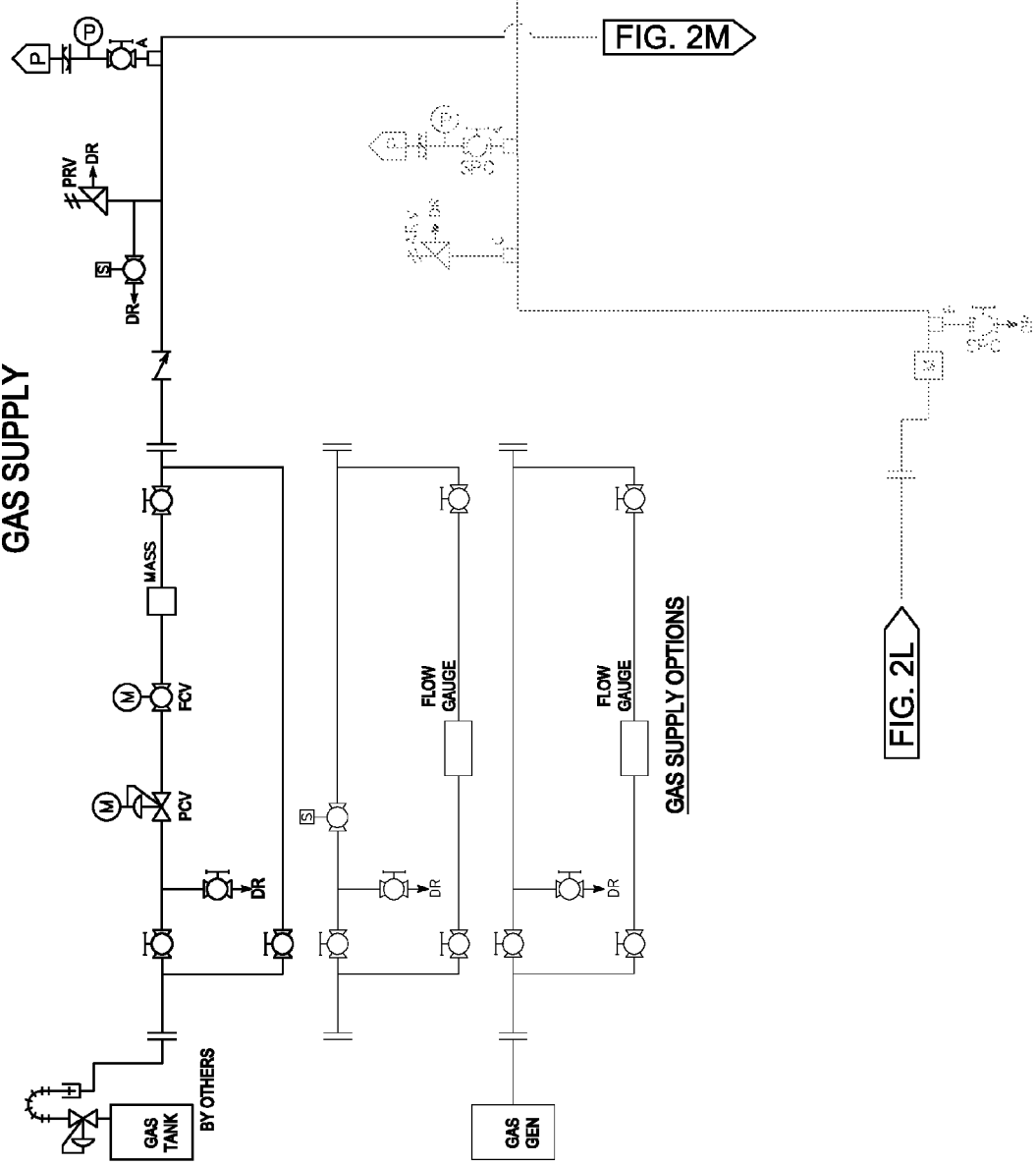

LIQUID SUPPLY

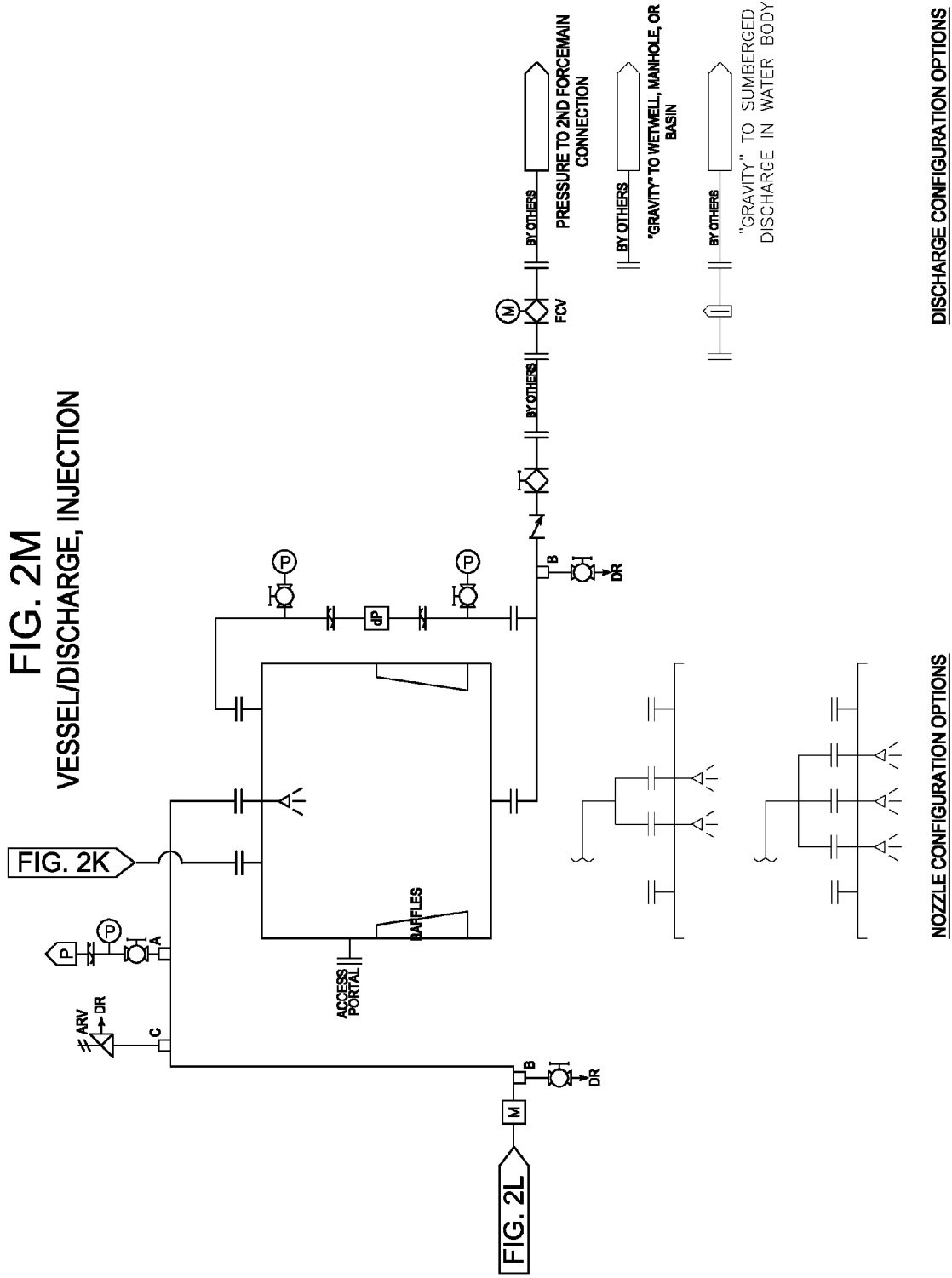

SYSTEMS AND METHODS FOR DELIVERING DISSOLVED GASES INTO FORCE-MAIN AND GRAVITY SEWERS

CROSS-REFERENCE TO RELATED APPLICATIONS

This application is a continuation-in-part application of, and claims the benefit of, U.S. patent application Ser. No. 11/921,057, filed Nov. 7, 2008 and issued as U.S. Pat. No. 8,276,888 on Oct. 2, 2012, which is a national stage entry of International Patent Application No. PCT/US2006/020391, which claims the benefit of U.S. patent application Ser. No. 11/137,856, filed May 25, 2005 and now issued as U.S. Pat. No. 7,255,332, which in turn claims priority to U.S. Provisional Patent Application No. 60/574,152, filed on May 25, 2004. This application also claims the benefit of U.S. Provisional Application No. 61/529,521, filed on Aug. 31, 2011, entitled "Systems and Methods for Delivering Dissolved Gases into Force-Main and Gravity Sewers." The disclosures of each of these applications are herein incorporated by reference in their entirety.

STATEMENT REGARDING FEDERALLY SPONSORED RESEARCH

The present invention has been supported at least in part by the National Science Foundation SBIR Program, Grant No. IIP-0750402DMI-041955. The Government has certain rights to the invention.

BACKGROUND OF THE INVENTION

1. Field of the Invention

The present invention relates to systems and methods for dissolving a gas, such as oxygen, in a liquid, and still further to systems and methods for dissolving a gas into wastewater for use in a force-main sewer or gravity sewer application.

2. Background of the Related Art

Municipal sewage (which, as used hereinafter, includes wastewater) collection, conveyance and treatment systems (hereinafter referred to as "sewage treatment systems") are extensive networks of interconnected pipeline infrastructure. Because of expansiveness and topography of municipal sewage treatment systems, sewage flows cannot always be conveyed by gravity. As a result, pumping sites are sometimes needed as part of the pipeline infrastructure to lift sewage flows over high points in the system or to the municipal treatment facilities.

A pumping site may be provided at a collection point of a project such as a housing development, an apartment complex development or a commercial office facility development. The pumping site is used to pump untreated sewage collected from the development through a "force-main" to a higher point where the untreated sewage can then flow via gravity to the municipal sewage treatment facility to be treated. Pumping sites may also be provided at low points in the pipeline infrastructure where gravity flow is no longer able to deliver the untreated sewage to the sewage treatment facility due to the topography. In most cases, the pumping site employs a collection sump, which receives and accumulates the untreated sewage from the upstream network of piping, and a mechanical pump which then pumps the sewage from the collection sump through the force-main to a higher point where the untreated sewage can flow by gravity to the sewage treatment facility to be treated. In a typical municipality, the sewage pipeline infrastructure of the sewage treatment system will contain numerous pumping sites to enable the flow of untreated sewage to reach the sewage treatment facility via both the force-main and gravity sewer pipelines.

Under anaerobic conditions, naturally present bacteria in a sewer system will convert sulfate compounds into reduced sulfur compounds, which are known to cause bad odors in sewers. One of these compounds, hydrogen sulfide, is known to form sulfuric acid when reacting with residual oxygen in the headspace of the sewer, which creates corrosion problems for steel and iron piping and other sewer components. By dissolving oxygen into the wastewater in a sewer system, the formation of an anaerobic condition is prevented, thereby reducing odor and controlling corrosion. Therefore, oxygenation of both force-main and gravity sewers can provide substantial benefits, and cost savings, when considering the operations and maintenance needs of these types of systems over their life-cycle.

Various systems are currently available for the pre-treatment of wastewater, including those that utilize oxygen for odor and corrosion control. For example, a generic pre-treatment system is described in U.S. Pat. No. 6,284,138 B1 to Hydro Flo, Inc. Further, a more specific application of super-oxygenation for odor/corrosion control is disclosed in U.S. Pat. No. 7,566,397 B2 to Eco Oxygen Technologies, LLC.

However, the above-described systems have several disadvantages when considering force-main and gravity sewer oxygenation applications. One of the main disadvantages is the inability to achieve dissolved oxygen concentrations greater than 300-mg/L, which is desirable due to the large oxygen demand in these types of systems. This is attributed primarily to the above-described technologies only operating at pressures slightly higher than contained in the pipeline system. Because of this, the above-described systems typically required larger vessels, piping and footprint, and ultimately result in higher capital costs. Furthermore, the design of the above-described systems typically limits the ability to tightly control oxygen delivery based on changing site conditions. Often times, this results in the over-design of systems, making them less cost-effective due to the decreased efficiencies. Finally, the use of gas bubbles for oxygen dissolution by the above-described systems is generally a less efficient means of dissolving oxygen and has the potential to create operational issues in force-main sewer applications by increasing the amount and frequency of air release valve operation.

Many different systems and methods are available for dissolving gases in liquids and are highly dependent on the needed application. Those methods for dissolving oxygen into water are specifically referenced here. Most dissolved gas delivery methods—bubble diffusion, Venturi injection, U-tubes, and Speece cones, for example—are based on increasing the contact time or surface area of gas bubbles introduced into a bulk liquid to enhance mass transfer.

Most, if not all, of these earlier technologies require recovery systems for off-gases that do not dissolve into the fluid or allow loss of undissolved gases. For example, U.S. Pat. No. 5,979,363 to Shaar describes an aquaculture system that involves piping a food and oxygen slurry into a pond. U.S. Pat. No. 5,911,870 to Hough discloses a device for increasing the quantity of dissolved oxygen in water and employs an electrolytic cell to generate the oxygen. U.S. Pat. No. 5,904,851 to Taylor discloses a method for enriching water with oxygen that employs a Venturi-type injector to aspirate gas into a fluid, followed by mixing to increase dissolution. U.S. Pat. No. 5,885,467 to Zelenak discloses mixing a liquid with oxygen using a plurality of plates or trays over which the liquid flows gradually downward. U.S. Pat. No. 4,501,664 to Heil discloses a device for treating organic wastewater with dissolved oxygen that employs several process compartments. U.S. Pat. No. 5,766,484 to Petit describes a dissolved gas flotation system for treatment of wastewater wherein the relative location of inlet and outlet structures reportedly maximizes the effect of air bubbles in separating solids from the fluid. U.S. Pat. No. 5,647,977 to Arnaud describes a system for treating wastewater that includes aeration, mixing/flocculating, and contact media for removing suspended solids. U.S. Pat. No. 5,382,358 to Yeh discloses an apparatus for separation of suspended matter in a liquid by dissolved air flotation. And U.S. Pat. No. 3,932,282 to Ettelt discloses a dissolved air flotation system that includes a vertical flotation column designed with an aim of preventing bubble breakage.

Mazzei injectors (see, e.g., U.S. Pat. Nos. 5,674,312; 6,193,893; 6,730,214) use a rapid flow of water to draw gas into the fluid stream; mixing chambers may or may not be used to increase contact time between the gas bubbles and the fluid to increase dissolution. The system described in U.S. Pat. No. 6,530,895 to Keirn has a series of chambers under pressure that add gaseous oxygen to fluid; the pressure increase and the chambers in series are used to increase dissolution. U.S. Pat. No. 6,962,654 to Arnaud describes a system that uses a radially grooved ring to break a stream of fluid into smaller streams; gas is introduced into the streams and mixing is used to increase dissolution. Speece (see U.S. Pat. Nos. 3,643,403; 6,474,627; 6,485,003; 6,848,258) proposes the use of head pressure to introduce liquid under pressure into a conical chamber; the downward flow of the fluid is matched in velocity to the upward flow of gas bubbles to increase dissolution time. Littman et al. (U.S. Pat. No. 6,279,882) uses similar technology to Speece except that the upward flowing bubble size is decreased with a Shockwave. Roberts, Jr. et al. (U.S. Pat. No. 4,317,731) propose turbulent mixing in an upper chamber to mix gas with a bulk fluid; a quiescent lower chamber allows undissolved gas to rise back into the upper chamber for remixing.

Other U.S. patents describe various methods of increasing the contact time between gas bubbles in fluids, including U.S. Pat. No. 5,275,742 to Satchell; U.S. Pat. No. 5,451,349 to Kingsley; U.S. Pat. No. 5,865,995 to Nelson; U.S. Pat. No. 6,076,808 to Porter; U.S. Pat. No. 6,090,294 to Teran; U.S. Pat. No. 6,503,403 to Green; and U.S. Pat. No. 6,840,983 to McNulty. Spears, et al. (U.S. Pat. Nos. 7,294,278; 7,008,535) describe a method for varying the dissolved oxygen concentration in a liquid by varying the pressure from 14.7 to 3000 psi inside an oxygenation assembly. Patterson, et al. (U.S. Pat. No. 6,565,807) describe a method for maintaining, adjusting, or otherwise controlling the levels of oxygen dissolved in blood (e.g., $pO_2$) by controlling the flow rates or by providing controlled amounts of the blood or oxygen gas.

These conventional systems for dissolving gases in liquids, and in particular conventional dissolved oxygen delivery systems are based on dissolving bubbles into stationary or flowing water and are greatly limited in the range of dissolved oxygen concentration that can be attained and controlled. These conventional systems are also limited to nearly steady-state use, and cannot quickly adjust dissolved oxygen concentrations to optimize water treatment. Bubble-based technology is limited to much lower dissolved oxygen concentration in the water being treated because of lower pressure and less-efficient gas transfer.

Accordingly, there is a need for systems and methods for optimizing the dissolution of a gas into a liquid, and in particular for systems that can be cost-effectively applied to force-main and gravity sewers for odor and corrosion control by adjusting dissolved oxygen concentrations to levels that are optimal for maintaining aerobic conditions. The systems and methods described in this disclosure meet this need.

SUMMARY OF THE INVENTION

The present invention is directed to systems and methods for dissolving gases in liquids and more specifically to systems and methods for delivering dissolved gasses, such as oxygen, into wastewater in force-main and gravity sewer applications. The present invention utilizes, in part, the systems and methods for dissolving gasses into liquid and delivery of dissolved gasses described in U.S. Patent Application Publication No. 2009/0166300 A1, published on Jul. 2, 2009, which is hereby incorporated by reference in its entirety.

The method of gas dissolution utilized in the present invention is superior to that of previous techniques used in force-main and gravity sewer applications, because it provides the following benefits: no bubbles are needed for oxygen transfer, it achieves significantly higher dissolved oxygen concentrations, more efficient oxygen delivery, and it reduces energy consumption per unit of oxygen delivered.

Dissolving gas within the treatment stream without the need for air or oxygen bubbles provides a critical benefit in a force-main application. Further, the present invention provides for significantly higher dissolved oxygen concentrations, in excess of 350-mg/L as compared to the 150-mg/L disclosed in U.S. Pat. No. 7,566,397 B2. Because the concentrations are much higher, the resulting flow for the same level of treatment is much less, which allows piping, valves, and other various appurtenances to be reduced in size resulting in capital cost savings. Additionally, the mechanism of dissolution promotes nearly full efficiency of oxygen transfer to the waste stream. Rather than being dependent on creating smaller and smaller air bubbles to increase transfer efficiency, this invention utilizes the head pressure to achieve greater than 95% oxygen transfer efficiencies over the entire operating range. Because the transfer efficiency is greater, long term operating costs associated with oxygen supply are reduced. In sum, the above efficiencies provide for a more economical solution to the oxygenation of force-main and gravity sewers for odor and corrosion control. Because of these efficiencies, this invention can significantly reduce life-cycle costs and ultimately the cost per unit of oxygen delivered when compared to other available technologies.

As discussed in the above paragraphs, the method of gas dissolution utilized in this invention is superior to that of previous inventions for force-main and gravity sewer applications. In one exemplary embodiment, that dissolution method includes the following steps: pressurizing an enclosed vessel with oxygen, wherein the gas enters the vessel at a controlled pressure until a desired higher is attained in the vessel; providing oxygen from a pressure-regulated line; and varying at least one parameter within the pressure vessel to vary the amount of gas dissolved in the liquid held in the vessel.

Several embodiments are envisioned for the application of this dissolution method in a force-main or gravity sewer. Generally, three alternative suction arrangements and two alternative discharge arrangements are envisioned for flexibility in application and operation.

The three envisioned suction arrangements include: suction from a pipeline (force-main or gravity sewer), suction from a wet well, or suction from a potable water supply. Because the dissolution technology utilizes an inlet, which may include a plurality of spray nozzles to achieve higher transfer efficiencies, it is necessary to ensure that solids of a certain size are either removed from the waste stream or reduced in size such that the spray nozzles are not clogged with large solids. Therefore, each suction alternative may be fitted with an appropriate commercially available technology and control devices to provide automatic pre-treatment of the waste stream when spray nozzles are utilized.

Embodiments of the present invention which utilize suction from the pipeline allow for the utilization of existing system pressures to reduce additional energy inputs required for oxygenation. Suction from the pipeline takes place at any location downstream of the pump or wet-well and may be fitted with either a commercially available in-line grinder or complete screening and de-gritting solution.

Embodiments of the present invention which utilize suction from a wet well minimize the impact on existing pump and system hydraulics. This alternative may be fitted with a commercially available self-backwashing intake screen or mechanical fine screen, such a perforated plate screen. This alternative may also be fitted with a commercially available in-line grinder or complete screening and de-gritting solution.

Embodiments of the present invention which utilize suction from potable water alternatives are utilized where required flow rates prove economically feasible to do so or when there is a need to minimize maintenance.

The embodiments of the invention which are considered discharge arrangements include: discharge to pipeline (forcemain or gravity sewer) or discharge to wet-well. Further, the dissolution technology utilizes a pressure control device to maintain desired pressure in the saturation tank. It is envisioned that the pressure control device will be either a control valve or an orifice tube.

In one embodiment, the discharge from the saturation tank will be regulated through a control valve capable of producing a large pressure drop, and maintaining the proper back pressure. In certain constructions, this valve may be fitted with an automated actuator. In one embodiment, this actuator may be programmed to allow the valve to be periodically purged by the fluid discharging the vessel.

In an alternate embodiment, the discharge from the pressure tank will be regulated through an orifice tube. Preferably, the orifice tube will be inserted through a full-bore ball valve or a gate valve, such that the orifice tube can be removed and the valve closed to allow cleaning or maintenance. Alternatively, the orifice tube will be set in the liquid in the fluid for recirculation.

Preferably, the system of the present invention can be constructed such that the suction and discharge line of the pump are fitted with a pressure sensing device, to allow detection of a changing pressure conditions, which would indicate maintenance needs. In one embodiment, the pressure sensing device will produce an electronic or pneumatic signal, which will allow a programmed system to initiate an alarm or system shut-down upon a pressure set-point. Still further, certain embodiments of the present invention include a control unit programmed to periodically purge the system to prevent accumulation of floating debris.

The gas dissolution system includes a lower-explosive-limit (LEL) detector or other hydrocarbon detection device to determine if an unsafe mixture of hydrocarbon and oxygen exists at any time in the pressurized vessel. In one embodiment, this LEL or other detector may be interconnected to automatically shut down the system upon a pre-programmed reading, and/or send an alarm to the operator.

It is envisioned that in certain embodiments, the gas dissolution system includes a dissolved oxygen (DO), oxidation reduction potential (ORP), or hydrogen sulfide (H2S) sensor and programming such that the system operates automatically to maintain a pre-established control variable set-point. In an alternate embodiment, the system may include a mass flow meter, or other method of measuring or extrapolating mass of oxygen, and programming to maintain an oxygen delivery rate.

The system can further include a programmable logic controller (PLC) which is interconnected with a distributed control system or a supervisory control and data acquisition (SCADA) system to allow monitoring of alarms and/or control of equipment from a remote location.

In an exemplary embodiment, the following instrumentation and control is envisioned for accurate control of gas dissolution and dissolved gas concentration. Specifically, the control technology is envisioned to allow independent control of each process variable. Further, each process variable can be controlled in either manual or automatic mode. In manual, the user inputs the desired value for each variable. In automatic mode, the user inputs only the desired gas delivery or effluent concentration desired, with the PLC performing calculations and automatically adjusting the other process variables as necessary to satisfy the user input:

Tank Level—The output from a level instrument can be utilized to modulate a flow control valve, maintaining a desired level in the saturation vessel. Level instrument is envisioned to be, but is not limited to, either, differential pressure, ultrasonic, radar, or other appropriate technology Gas Pressure—The output from a pressure instrument attached to the saturation vessel, can be utilized to modulate an electronic pressure regulator located in the gas feed line. This allows for electronic pressure control within the saturation vessel.

Gas Flow—The output from a gas flow meter instrument, located in the gas feed line, can be utilized to modulate an electronic flow control valve. This allows for electronic control of gas flow entering saturation vessel. Combination mass flow controllers will provide similar functionality with one instrument.

Liquid Flow—The output from a liquid flow meter instrument, located in the pump or a saturation vessel discharge line, can be utilized to control pump speed. The feed pump can be equipped with a variable frequency drive (VFD) which will operate based on the signal from the liquid flow meter. Flow meter is envisioned to be an electromagnetic flow meter or other technology appropriate for streams containing high levels of solids. Those skilled in the art will readily appreciate that other techniques and devices can be used to control the liquid flow rate into and out of the saturation vessel, as well as, control the liquid level within the tank, without departing from the inventive aspects of the present disclosure.

Further, additional electronic pressure gauges and pressure switches can be included with the system to provide both safety and insight as to when maintenance in necessary. Specifically, it is envisioned that the saturation vessel/tank can be equipped with a high pressure switch which will shut the system down if the pressure in the saturation vessel exceeds a given value. Also, pressure upstream of the inlet will be monitored, along with liquid flow rate, as a method for indicating maintenance is needed. In addition, it is also envisioned that the PLC will continuously monitor the control variables, perform theoretical calculations, and provide alarm conditions, or shutdown, if the unit appears to be operating outside of normal ranges.

Those skilled in the art will readily appreciate that the above described control methods can readily be modified without deviating from the scope of this invention. For example, the feed pump VFD could be utilized to control the vessel level while the flow control valve is modulated to control the liquid flow.

The following table provides specific information with regard to the design criteria for the present invention. It will be obvious to those skilled in the art that other variations of these criteria are possible without deviating from the scope of the invention. Additionally, the minimum and maximum numbers provided for the various design criteria are approximate values and are not intended to limit the scope of the present invention.

Typical Design Criteria [1]

| Feature | units | Minimum | Maximum [2] |
|---|---|---|---|
| Grinder/Screen [3] | | | |
| Max Solid | in | 0 | 0.375 |
| Flowrate | gpm | 0 | na |
| Pressure | psi | 0 | 100 |
| Feed Pump [4] | | | |
| Flowrate | gpm | 0 | na |
| Pressure | psi | 20 | 180 |
| Spray Nozzle | | | |
| Max Solid | in | 0 | 1.5 |
| Flowrate | gpm | 0 | na |
| Pressure Drop | psi | 5 | 60 |
| Level Control Valve [5] | | | |
| Flowrate | gpm | 0 | na |
| Pressure Drop | psi | 20 | 100 |
| Oxygen Delivery | | | |
| Mass Delivered | lb/d | 0 | na |
| Effluent Conc. | mg/L | 0 | 400 |

[1] Typical design criteria are intended to provide those skilled in the art additional information to understand the methods for dissolution of gas in force-main and gravity sewer systems. Variations of the values shown here, to fit a specific application, do not constitute a deviation from the scope of this invention.
[2] Scope of invention is, in theory, infinitely scalable.
[3] Wastewater influent will pass through grinder or self-cleaning screen when utilization of a spray nozzle requires it.
[4] Pump will be a solids handling pump - centrifugal or positive displacement type, self-priming or equipped with a vacuum priming system where needed.
[5] Control valve will be capable of large pressure drop, can be fully opened - ball, butterfly, globe, or plug type.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how the methods and systems for optimizing the dissolution of a gas into a liquid function for force-main and gravity sewer applications, preferred embodiments of the systems and methods are described in detail below with reference to the following figures:

FIG. 1a is a schematic diagram of a gas dissolution system used in a force-main application which has been constructed in accordance with a first embodiment of the present invention;

FIG. 1b is a schematic diagram of a gas dissolution system used in a force-main or sewer application which has been constructed in accordance with a second embodiment of the present invention;

FIGS. 2a-2m provide a schematic representation of the system instrumentation and arrangement which can be used in a typical force-main application; and These and other aspects of the subject invention will become more readily apparent to those having ordinary skill in the art from the following detailed description of the preferred embodiments of the invention taken in conjunction with the drawings.

DETAILED DESCRIPTION OF PREFERRED EMBODIMENTS

Figure 2L:
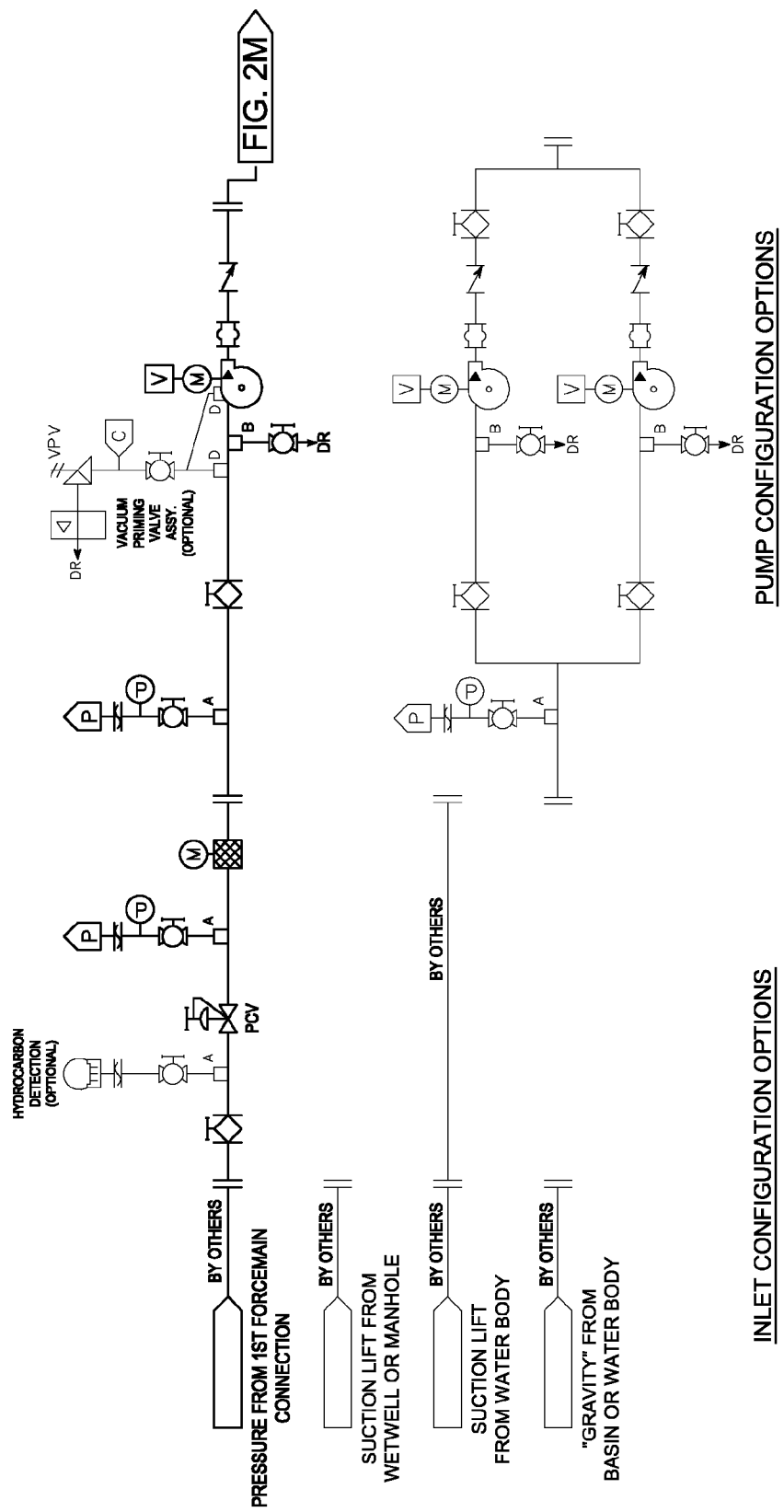

Reference will now be made in detail to the present preferred embodiments of the systems and methods for the dissolution of a gas, such as oxygen, into a liquid, such as wastewater. It will be understood that the disclosed embodiments are merely examples of ways in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure.

Referring now to FIG. 1a, which illustrated a first embodiment of a wastewater pre-treatment system/apparatus of the present invention which has been designated generally as reference numeral 100. System 100 is shown installed in a force-main application in which untreated wastewater is supplied by inflow piping 50 into a sump 54. The untreated wastewater "A" contained within sump 52 is pre-treated by system 100 and treated wastewater "B" is then injected into outflow piping 56 where it proceeds to the wastewater treatment plant.

Treatment system 100 includes saturation or dissolution tank assembly 2, and a pump 4 which is in fluid communication with the dissolution tank assembly 2. As noted above, inflow pipe 50 provides wastewater "A" into sump 54. Pump 4 withdraws a portion of the untreated wastewater "A" from sump 54 and through a screen or grinder 8 where required by spray nozzle size. A gas source 12 is also in fluid communication with dissolution tank assembly 2 and is configured to supply a quantity of gas (e.g. oxygen) to dissolution tank 2. Those skilled in the art will readily appreciate that other gases can be dissolved into the wastewater or source water without departing from the inventive aspects of the present disclosure. For example, the gas could be air, oxygen, ozone, hydrogen, nitrogen, nitrous oxide, and carbon dioxide.

Dissolution tank assembly 2 includes a pressure vessel 14 for containing treated wastewater 16 and provides a gas headspace 18 above the treated fluid. In one exemplary operating embodiment, gas headspace 18 is at a super-atmospheric pressure. Dissolution tank assembly 2 also includes a liquid inlet 20 which is configured to inject the wastewater being pumped from pump 4 into pressure vessel 14 of dissolution tank assembly 2. The inlet 20 may include a spray nozzle. Those skilled in the art will readily appreciate that more than one spray nozzle can be used to supply the fluid into the pressure vessel without departing from the scope of the present invention.

An exemplary manner in which the oxygen gas is dissolved into the fluid contained within the pressure vessel 14 is described in U.S. Patent Application Publication No. 2009/0166300 A1, published on Jul. 2, 2009, and will not be described in detail herein. As a result of the wastewater being introduced through the gas head space 18 in system 100, the oxygen contained within the head space 18 is dissolved into the wastewater "A", resulting in treated wastewater "B". The treated wastewater "B" is supplied to outflow piping 56 through for example, a pressure regulating valve 26.

Although, the gas source 12 preferably provides oxygen, those skilled in the art will recognize that other gases such as ozone, hydrogen, nitrogen, nitrous oxide, or carbon dioxide can be used.

FIGS. 2a and 2b provide a schematic representation of the system instrumentation and arrangement which can be utilized in a typical force-main application which uses system 100.

Referring now to FIG. 1b, which discloses a pre-treatment system 101 which is also installed in a force-main application. System 101 is similar in operation and arrangement to system 100, except that the suction and discharge arrangements are different. In system 101, suction of untreated wastewater "A" is pulled by pump 4 from the wet well or sump 54 and through a screen or grinder 8 where required by spray nozzle size. After passing through system 100, the treated wastewater "B1" is discharge back into the sump 54 where is mixes with the untreated wastewater and then proceeds to the sewer treatment plant through force main outflow pipe 56 or gravity main outflow pipe 58.

FIGS. 2a and 2b illustrate several alternative suction and discharge arrangements which can be used without departing from the scope of the present invention. In one embodiment, suction is pulled from the force-main or gravity sewer and discharged back into the force-main or gravity sewer. In an alternative arrangement, suction is pulled from the force-main or gravity sewer and discharged back into the wet well. In one embodiment, suction is pulled from the wet well and discharged back into the force-main or gravity sewer. In one embodiment, suction is pulled from the wet well and discharged back into the wet well. In one embodiment, suction is provided from potable water supply and discharged back into the force-main or gravity sewer. In one embodiment, suction is provided from potable water supply and discharged into the wet well.

One issue with using raw wastewater in the system for dissolving gasses is the possibility of large solid particles plugging the spray nozzle(s) 20 if utilized, the pressure regulating valve 26, or the orifice(s) in the orifice tube 28. To reduce the chance of plugging, solids either need to be removed from the waste stream or reduced to a size that will prevent plugging.

In one embodiment, the intake screen 8 includes a backwash feature, which is supplied with screened water, pressurized by pump 4, regulated by valve 35, and conveyed by line 36. The back-washed solids are expected to be rejected from the intake screen 8, collected in pump 32 and conveyed in pipe 24 to the wastewater treatment plant.

In one embodiment, the intake screen 8 includes a mechanism for removing solids from the wet well, such as a stepping action. The removed solids are expected to be discharged from the intake screen 8, washed, compacted and bagged to minimize odors prior to disposal.

In one embodiment, the pressure in the force-main will feed an in-line grinder. The grinder will minimize solid size and the waste stream will enter pump 4.

In one embodiment, pressure sensing device 38 can detect pressure changes, which would be symptomatic of a plugged intake screen or spray nozzle. In one embodiment, the pressure sensing device 38 can be connected to the programmable logic controller 34 through an electronic or pneumatic signal, and the controller can be programmed to produce an alarm signal, and/or initiate an automatic shut-down of the system.

The potential for solids plugging can also be an issue at the point the fluid is discharged into pipe 24. In one embodiment, a pressure regulating valve 26 can be set to provide sufficient back pressure for dissolution vessel 2, while maintaining the desired flow of gasified fluid 16 into fluid, conveyed in pipe 24. In one embodiment, pressure regulating valve 26 can be actuated to periodically open to allow purging of solids into pipe 24. In an alternate embodiment, an orifice tube 28, with one or more orifices, can be inserted into pipe 24 through valve 30 to allow injection of gasified fluid 16 into fluid 6, conveyed in pipe 24. If maintenance or cleaning is needed, orifice tube 28 can be retracted through valve 30, and valve 30 closed to allow temporary operation of the sewer without the addition of gasified liquid.

System 100, including all embodiments depicted in FIGS. 1a-1b, may also include one or more programmable logic controllers or other control devices 34 interfacing with system 100 to allow for automated adjustment of various parameters within system 100, including, but not limited to, pressure within vessel 14, flow rate of the fluid 16 into and out of pressure vessel 14, retention time of gas and liquid in vessel 14, gas flow rate into vessel 14, the liquid spray pattern from spray nozzles 20, and the rate of internal mixing within vessel 14.

Although the schematic shown in FIG. 1a shows control device 34 connected to pressure vessel 14, it should be understood that systems 100/101 may include a plurality of control devices 34 interfacing with any of the various parts of system 100/101, with each other, and with those items depicted in the other figures. Control devices 34 may be hard-wired or they may operate wirelessly, and may be able to be controlled remotely through a network. In addition, control devices 34 may be any suitable device, including mechanical or other manually operated devices.

One method of increasing dissolved gas concentration in the fluid passing through pressure vessel 14 is to increase the pressure within vessel 14, thus allowing a higher concentration of gas to be dissolved.

In one embodiment, the dissolution vessel 14 will be fitted with a lower-explosive-limit (LEL) sensing device, or other hydrocarbon detecting device in fluid communication with gas headspace 18. This device will electronically communicate with the programmable logic controller 34. In the event the device detects hydrocarbon concentrations above an operator designated setpoint, the controller 34 will initiate an audible alarm and/or a shut-down of the system, as is programmed into the controller.

In one embodiment, the controller will be in electronic communication with a distributed control system (DCS) or system control and data acquisition (SCADA) system. The communication with the DCS or SCADA will allow alarms to from the system to be registered at a remote monitoring location, and for the system to receive remote commands for start-up or shut-down. The integration with the DCS or SCADA system will also allow the controller 34 to receive a signal proportional to a down-stream condition, such as flow rate or dissolved oxygen concentration, and adjust operation of the system accordingly.

The systems and methods described in this disclosure improve upon the systems and methods described in U.S. Pat. No. 7,255,332. When compared to the system described in U.S. Pat. No. 7,255,332, systems 100/101 have the ability to introduce dissolved gas into a fluid with a high solids content being transferred in a pipeline or other enclosed conveyance. In an embodiment of the system, dissolved gas can be delivered to a force-main or gravity wastewater sewers system. If oxygen is delivered with this system, the addition of oxygen can be used to maintain aerobic conditions, which will reduce the development of odor-causing compounds, and help prevent corrosion of sewer pipe caused by the creation of sulfuric acid, derived from hydrogen sulfide, produced by natural occurring bacteria in anaerobic conditions.

It will be apparent to those skilled in the art that numerous other variations of the described system for optimizing the dissolution of a gas into a liquid are possible without departing from the scope of the invention.

Additionally, an apparatus of the invention comprises a discharge device external the dissolution tank and connected thereto via the fluid outlet. The discharge device is provided with one or more orifices through which treated fluid can pass from the dissolution tank and into a region external the apparatus. Once the treatment water is released to the target water being treated, there is a pressure drop to ambient conditions and the water is then considered supersaturated with oxygen. If the supersaturated water is then mixed with the target water at a ratio resulting in sub-saturated oxygen concentration in the bulk water, the additional oxygen will remain in solution and increase the dissolved oxygen content of the target water. Several methods have been devised to mix the supersaturated water with the water being treated, which are discussed hereinbelow. If vigorous mixing and wide distribution of oxygen is required, the discharge device is configured such that discharge orifices can be placed inside an entrainment pipe of larger diameter that is open at both ends. The treatment water is then ejected from the orifice at a high velocity into the entrainment pipe. This causes entrainment of the target water into the entrainment pipe and provides vigorous local mixing of treatment water and target water. The mixed water exits the discharge device with velocity to provide distribution of oxygenated water. If vigorous mixing is not desired and only localized oxygenation is required, the treatment water exits through many smaller orifices rather than a single larger orifice. The multitude of smaller orifices provides the same overall pressure drop when exiting the discharge device as the single orifice. This allows treatment water to be ejected from the discharge with less momentum and at many different directions allowing the dissolved oxygen to be maintained in a smaller area. Entrainment pipes can also be added to each orifice to provide mixing without unidirectional high velocity injection. The advantage of these methods of mixing treatment water with the target water is that degassing of the supersaturated stream is prevented and no gas bubbles are formed. Mixing liquids with liquids is much more efficient than mixing gases with liquids. Thereby, it is much more effective to mix a supersaturated stream of treatment water into the target water than it is to mix gas bubbles within the target water.

What is claimed is:

1. A method for pre-treating wastewater in a force-main or sewer system, the method comprising the steps of:
    (a) passing an intake fluid into an enclosed vessel;
    (b) pressurizing the enclosed vessel with gas, wherein the gas enters the vessel at a controlled pressure and is pressurized until a desired pressure is attained in the vessel;
    (c) providing a gas source interfacing with the vessel to regulate the amount and type of gas that enters the vessel;
    (d) providing means for removing solids from the intake fluid;
    (e) providing means to remove accumulation of solids from the system; and
    (f) providing means for introduction of a gasified discharge fluid to be introduced into an enclosed pipe, wherein the means for introduction includes an orifice tube configured to prevent bubble formation within the enclosed pipe.

2. The method of claim 1, wherein the step of providing a means for removing solids from the intake fluid is provided by an intake screen, in-line grinder, or complete fine screen and de-gritting unit.

3. The method of claim 2, wherein the intake screen the in-line grinder or the complete fine screen and de-gritting unit provides a means for automatic operation.

4. The method of claim 1, wherein the step of removing accumulated solids from the system is provided by an operating sequence in which the dissolution vessel is periodically emptied.

5. The method of claim 4, wherein the operating sequence is controlled by a programmable logic controller or other controller.

6. The method of claim 1, wherein the step of removing accumulated solids from the system is provided by an actuated valve with an operating sequence which periodically opens the valve to allow purging of the accumulated solids into the sewer.

7. The method of claim 6, wherein the operating sequence is controlled by a programmable logic controller or other controller.

8. The method of claim 1, further comprising the step of opening a valve, wherein the valve is of construction which provides a large pressure drop.

9. The method of claim 1, wherein the orifice tube is inserted through a full-bore ball valve, gate valve, other valve, pipe fitting, pipe saddle, or blind flange with means of insertion of the orifice tube.

10. The method of claim 1, wherein a quality of the gas in the headspace of the pressurized vessel is monitored for hydrocarbon.

11. The method of claim 10, wherein the monitoring is performed by a lower-explosive-limit detector or other hydrocarbon detector.

12. The method of claim 11, wherein a detector is in electronic communication with a programmable logic controller.

13. The method of claim 12, wherein the programmable logic controller is programmed to sound an audible alarm and/or initiate a system shut-down upon a condition determined by the detector.

14. The method of claim 2, wherein the condition of the device is monitored by sensing the pressure on a suction line between the device and a pump.

15. The method of claim 14, wherein the pressure sensing device is a pressure transducer or a pressure switch.

16. The method of claim 14, wherein the pressure sensing device is in electronic communication with a programmable logic controller.

17. The method of claim 14, wherein the programmable logic controller is programmed to send an alarm signal and/or initiate a shutdown sequence when the signal from the pressure sensing device indicates a low pressure on the pump intake.

18. The method of claim 1, wherein the system can be started, stopped, and operated remotely through a distributed control system or a system control and data acquisition (SCADA) system.

19. The method of claim 1, wherein the discharge of the gasified fluid is recirculated back to a wet-well from which it was drawn.

20. A method for pre-treating wastewater in a force-main or sewer system, the method comprising the steps of:
    (a) passing an intake fluid into an enclosed vessel;

(b) pressurizing the enclosed vessel with gas, wherein the gas enters the vessel at a controlled pressure and is pressurized until a desired pressure is attained in the vessel;

(c) providing a gas source interfacing with the vessel to regulate the amount and type of gas that enters the vessel, wherein a quality of the gas in a headspace of the vessel is monitored for hydrocarbon;

(d) providing means for removing solids from the intake fluid;

(e) providing means to remove accumulation of solids from the system; and (f) providing means for introduction of a gasified discharge fluid to be introduced into an enclosed pipe.

21. A method for pre-treating wastewater in a force-main or sewer system, the method comprising the steps of:

(a) passing an intake fluid from a sump or a wet-well into an enclosed vessel;

(b) pressurizing the enclosed vessel with gas, wherein the gas enters the vessel at a controlled pressure and is pressurized until a desired pressure is attained in the vessel;

(c) providing a gas source interfacing with the vessel to regulate the amount and type of gas that enters the vessel;

(d) providing means for removing solids from the intake fluid; and (e) passing a gasified discharge fluid from said enclosed vessel to said sump or said wet-well.

* * * * *